US005526798A

United States Patent [19]

Seki

[11] Patent Number: 5,526,798

[45] Date of Patent: Jun. 18, 1996

[54] AIR-FUEL RATIO CONTROL SYSTEM FOR INTERNAL COMBUSTION ENGINES

[75] Inventor: Yasunari Seki, Wako, Japan

[73] Assignee: Honda Giken Kogyo Kabushiki Kaisha, Tokyo, Japan

[21] Appl. No.: 405,519

[22] Filed: Mar. 16, 1995

[30] Foreign Application Priority Data

Mar. 18, 1994 [JP] Japan .................................... 6-073914

[51] Int. Cl.$^{6}$ ............................ F02B 77/08; F02D 33/00; G05B 23/02

[52] U.S. Cl. ........................................... 123/688; 73/118.1

[58] Field of Search .................................... 123/479, 688, 123/690; 73/23.32, 118.1; 204/401; 340/438

[56] References Cited

U.S. PATENT DOCUMENTS

| | | | |
|---|---|---|---|
| 4,121,548 | 10/1978 | Hattori et al. | 123/688 X |
| 4,149,408 | 4/1979 | Ezoe et al. | 123/118.1 |
| 5,379,635 | 1/1995 | Gee et al. | 123/688 X |

FOREIGN PATENT DOCUMENTS

| | | | |
|---|---|---|---|
| 61-212643 | 9/1986 | Japan | 123/688 |

*Primary Examiner*—Tony M. Argenbright
*Attorney, Agent, or Firm*—Nikaido, Marmelstein, Murray & Oram

[57] ABSTRACT

An air-fuel ratio control system for an internal combustion engine comprises an exhaust gas component concentration sensor arranged in the exhaust system of the engine, for detecting concentration of oxygen present in exhaust gases emitted from the engine, and an ECU which controls the air-fuel ratio of an air-fuel mixture to be supplied to the engine, based on the difference between an output value from the exhaust gas component concentration sensor and a predetermined reference value, and detects deterioration of the exhaust gas component concentration sensor, based on the output value from the exhaust gas component concentration sensor. When the deterioration of the exhaust gas component concentration sensor is detected, a deterioration display signal is outputted, while whether execution of air-fuel ratio control is to be inhibited or to be continued is determined based on the deterioration degree of the exhaust gas component concentration sensor.

5 Claims, 6 Drawing Sheets

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system for internal combustion engines, and more particularly to an air-fuel ratio control system of this kind, which is provided with an exhaust gas component concentration sensor in the exhaust system of the engine, and controls the air-fuel ratio of an air-fuel mixture supplied to the engine, based on results of comparison between an output value from the exhaust gas component concentration sensor and a predetermined reference value.

2. Prior Art

To reduce the amount of noxious components in exhaust gases emitted from internal combustion engines, an air-fuel ratio feedback control system is widely known, which is provided with an exhaust gas component concentration sensor arranged in the exhaust system of the engine, and controls the air-fuel ratio of an air-fuel mixture in a feedback manner responsive to an output value from the exhaust gas component concentration sensor. However, the known air-fuel ratio feedback control system has a drawback that the air-fuel ratio control cannot be carried out in a desired manner when the exhaust gas component concentration sensor undergoes a failure, such as disconnection or short-circuit of an electric system of the exhaust gas component concentration sensor.

To overcome the above drawback, a checking system for the air-fuel ratio control system has been proposed, for example, by U.S. Pat. No. 4,149,408, which is provided with an abnormality-detecting circuit for detecting abnormality of the exhaust gas component concentration sensor. When an abnormality of the exhaust gas component concentration sensor is detected by the abnormality-detecting circuit, the proposed checking system operates to inhibit the feedback control of the air-fuel ratio and light up an alarm lamp to inform the driver of the abnormality.

According to the proposed checking system, since the feedback control of the air-fuel ratio is thus inhibited when an abnormality of the exhaust gas component concentration sensor is detected by the abnormality-detecting circuit, degradation of the drivability of the engine ascribable to erroneous correction of the fuel amount to be supplied to the engine can be prevented.

The proposed checking system detects not only abnormality of the exhaust gas component concentration sensor caused by disconnection and short-circuit of the electrical system of the sensor but also abnormality of the sensor due to aging thereof, such as degradation of the responsiveness of the sensor. When such abnormality due to aging is detected, however, it is sometimes better to continue the feedback control of the air-fuel ratio than to inhibit the same, depending on the deterioration degree of the exhaust gas component concentration sensor, to maintain required drivability and exhaust emission characteristics of the engine.

However, the proposed checking system inhibits execution of the feedback control even when the deterioration degree of the sensor is so small that exhaust gases can still be purified to a sufficient degree by a catalytic converter arranged in the exhaust pipe at a location downstream of the sensor. As a result, the inhibition of the feedback control under such circumstances even results in further degraded exhaust emission characteristics of the engine.

SUMMARY OF THE INVENTION

It is an object of the invention to provide an air-fuel ratio control system for internal combustion engines, which is capable of controlling the air-fuel ratio control in dependence on the deterioration degree of the exhaust gas component concentration sensor even when the sensor is detected to be deteriorated, to thereby maintain good drivability of the engine and avoid degraded exhaust emission characteristics of the engine.

To attain the above object, the present invention provides an air-fuel ratio control system for an internal combustion engine having an exhaust system, comprising:

exhaust gas component concentration-detecting means arranged in the exhaust system of the engine, for detecting concentration of a specific component present in exhaust gases emitted from the engine;

air-fuel ratio control means for controlling an air-fuel ratio of an air-fuel mixture to be supplied to the engine, in response to a difference between an output value from the exhaust gas component concentration-detecting means and a predetermined reference value;

deterioration-detecting means for detecting deterioration of the exhaust gas component concentration-detecting means, based on the output value from the exhaust gas component concentration-detecting means;

display signal-output means for outputting a deterioration display signal when deterioration of the exhaust gas component concentration-detecting means is detected by the deterioration-detecting means; and control means for determining whether execution of the air-fuel ratio control means is to be inhibited or to be continued, based on a deterioration degree of the exhaust gas component concentration-detecting means when deterioration of the exhaust gas component concentration-detecting means is detected by the deterioration-detecting means.

Preferably, the control means inhibits the execution of the air-fuel ratio control when the deterioration degree of the exhaust gas concentration-detecting means is larger than a predetermined value, and continues the execution of the air-fuel ratio control when the deterioration degree of the exhaust gas concentration-detecting means is smaller than the predetermined value.

More preferably, the exhaust gas concentration-detecting means has the output value therefrom inverted when an air-fuel ratio of the exhaust gases changes across a stoichiometric air-fuel ratio, the control means inhibiting the execution of the air-fuel ratio control when an inversion period of the output value is larger than a predetermined value, and continuing the execution of the air-fuel ratio control when the inversion period of the output value is smaller than the predetermined value.

Advantageously, when deterioration of the exhaust gas component concentration-detecting means is detected, the display signal-output means outputs the deterioration display signal irrespective of a degree of the detected deterioration.

Also advantageously, when deterioration of the exhaust gas component concentration-detecting means is detected, the display signal-output means outputs the deterioration display signal in a manner dependent upon the degree of the detected deterioration.

The above and other objects, features and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
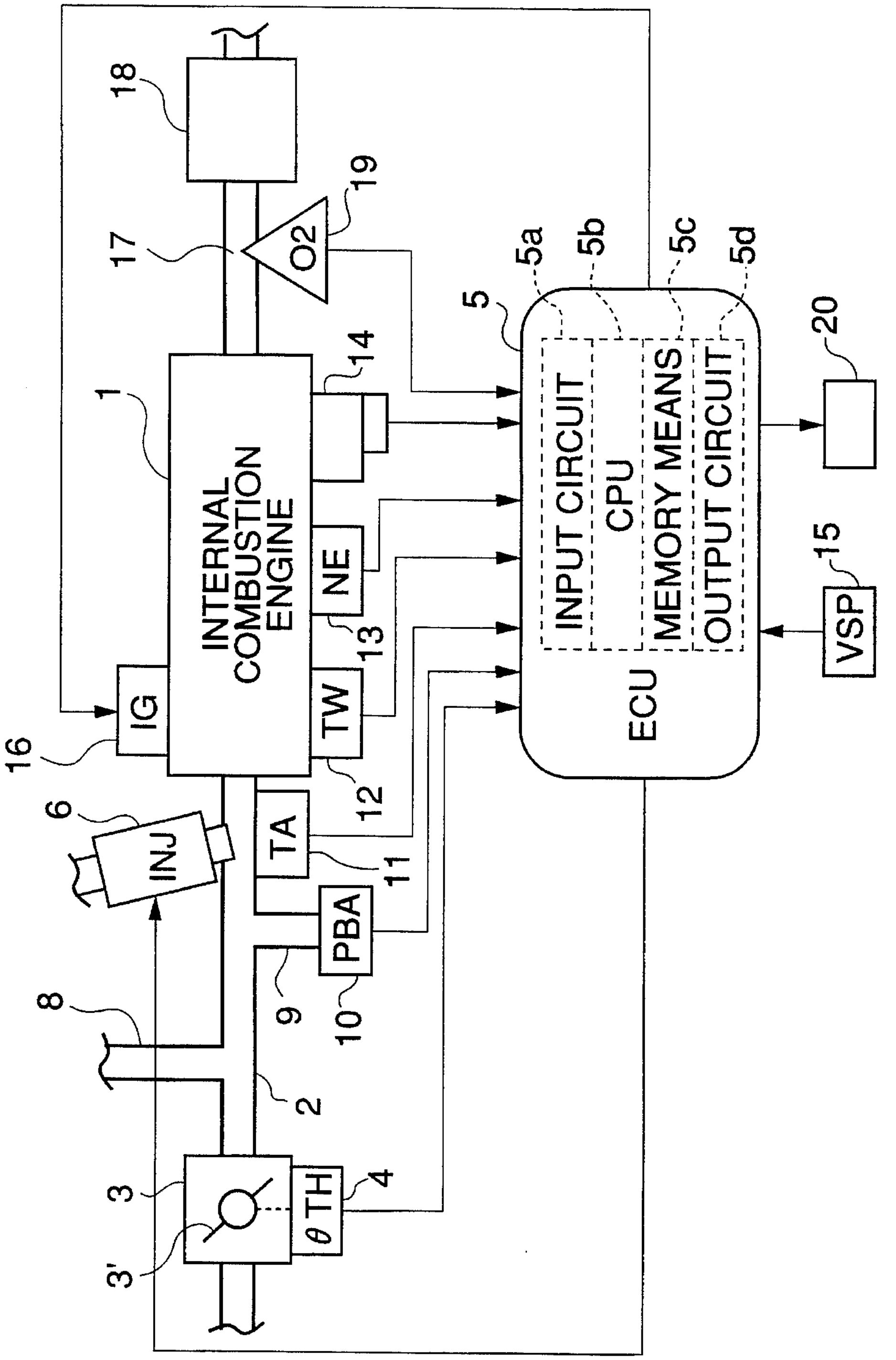
FIG. 1 is a block diagram schematically showing the arrangement of an internal combustion engine and an air-fuel ratio control system therefor, according to an embodiment of the invention.

Referring first to FIG. 1, there is schematically illustrated the arrangement of an internal combustion engine and an air-fuel ratio control system therefor, according to an embodiment of the invention.

In the figure, reference numeral 1 designates an internal combustion engine (hereinafter simply referred to as "the engine") having four cylinders. In an intake pipe 2 of the engine 1, there is arranged a throttle body 3 accommodating a throttle valve 3' therein. A throttle valve opening (θTH) sensor 4 is connected to the throttle valve 3', for generating an electric signal indicative of the sensed throttle valve opening θTH and supplying the same to an electronic control unit (hereinafter referred to as "the ECU") 5.

Fuel injection valves 6, only one of which is shown, are inserted into the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

A purging passage 8 is open into the intake pipe 2 at a location downstream of the throttle valve 3', which is connected to an evaporative emission control system, not shown.

Further, an intake pipe absolute pressure (PBA) sensor 10 is provided in communication with the interior of the intake pipe 2 via a conduit 9 opening into the intake pipe 2 at a location downstream of the purging passage 8. The PBA sensor 10 is electrically connected to the ECU 5, for supplying an electric signal indicative of the sensed absolute pressure PBA within the intake pipe 2 to the ECU 5.

An intake air temperature (TA) sensor 11 is inserted into the intake pipe 2 at a location downstream of the conduit 9, for supplying an electric signal indicative of the sensed intake air temperature TA to the ECU 5.

An engine coolant temperature (TW) sensor 12 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 13 is arranged in facing relation to a camshaft or a crankshaft of the engine 1, neither of which is shown.

The NE sensor 13 generates a signal pulse (hereinafter referred to as "a TDC signal pulse") at each of predetermined crank angles of the engine 1 whenever the crankshaft rotates through 180 degrees, the TDC signal pulse being supplied to the ECU 5.

A transmission 14 is interposed between vehicle wheels, not shown, and the engine 1, the vehicle wheels being driven via the transmission 14 by the engine 1.

Further, an automotive vehicle speed (VSP) sensor 15 is arranged to detect rotation of one of the vehicle wheels to thereby detect the traveling speed VSP of an automotive vehicle on which the engine 1 is installed, of which an output signal indicative of the sensed vehicle speed VSP is supplied to the ECU 5.

Each cylinder of the engine 1 has a spark plug 16 electrically connected to the ECU 5 to have its ignition timing controlled by a signal therefrom.

A catalytic converter (three-way catalyst) 18 is arranged in an exhaust pipe 17 of the engine 1, for purifying noxious components, such as HC, CO, NOx, which are present in exhaust gases from the engine.

An oxygen concentration sensor (hereinafter referred to as "the O2 sensor") 19 as an exhaust gas component concentration sensor is arranged in the exhaust pipe 17 at a location upstream of the catalytic converter 18, for detecting the concentration of oxygen present in exhaust gases, and generating a signal indicative of the sensed oxygen concentration to the ECU 5. More specifically, the O2 sensor 19 has a sensor element formed of a zirconia solid electrolyte ($ZrO_2$), having a property that an electromotive force thereof drastically changes as the air-fuel ratio of exhaust gases changes across a stoichiometric air-fuel ratio. That is, an output signal from the O2 sensor 19 is inverted from a lean state to a rich state with respect to the stoichiometric air-fuel ratio or vice versa as the air-fuel ratio crosses the stoichiometric air-fuel ratio, such that the output signal from the 02 sensor 19 goes high in level when the air-fuel ratio of exhaust gases becomes rich, and goes low in level when the air-fuel ratio of exhaust gases becomes lean, respectively. The output signal from the O2 sensor 19, thus being indicative of the sensed O2 concentration, is supplied to the ECU 5.

Further connected to the ECU 5 is an alarm lamp 20 formed of a light emitting diode (LED) or the like, which is arranged, for example, on a dash board within the compartment of the automotive vehicle, to warn the driver of deterioration of the O2 sensor 19 in response to a signal supplied from the ECU 5.

The ECU 5 is comprised of an input circuit **5*a* having the functions of shaping the waveforms of input signals from various sensors including ones mentioned above, shifting the voltage levels of sensor output signals to a predetermined level, converting analog signals from analog-output sensors to digital signals, and so forth, a central processing unit (hereinafter referred to as the "the CPU") 5*b*, memory means 5*c* storing various operational programs which are executed by the CPU 5*b* and for storing results of calculations therefrom, etc., an output circuit 5*d* which delivers driving signals to the fuel injection valves 6, the spark plugs 16**, etc.

The CPU **5*b* operates in response to the above-mentioned signals from the sensors to determine operating conditions in which the engine 1 is operating, such as an air-fuel ratio feedback control region in which air-fuel ratio control is carried out in response to oxygen concentration in exhaust gases, and open-loop control regions, and calculates, based upon the determined engine operating conditions, a valve opening period or fuel injection period Tout over which the fuel injection valves 6** are to be opened in synchronism with generation of TDC signal pulses, by the use of the following equation (1):

$$Tout=Ti\times KO2\times K1+K2( \quad (1)$$

where Ti represents a basic value of the fuel injection period Tout, which is determined according to engine operating parameters, such as the engine rotational speed NE and the intake pipe absolute pressure PBA indicative of load on then engine, by the use of a Ti map, not shown, which is stored in the memory means 5*c*.

KO2 represents an air-fuel ratio correction coefficient calculated based on the output signal from the O2 sensor 19, which is set to such a value that the air-fuel ratio (oxygen concentration) detected by the O2 sensor 19 becomes equal to a desired value when the engine 1 is operating in the air-fuel ratio feedback control region, while it is set to predetermined values corresponding to the respective open-loop control regions of the engine 1 when the engine 1 is in the open-loop control regions.

K1 and K2 represent other correction coefficients and correction variables, respectively, which are set according to engine operating parameters to such values as optimize operating characteristics of the engine, such as fuel consumption and engine accelerability.

Figure 2:
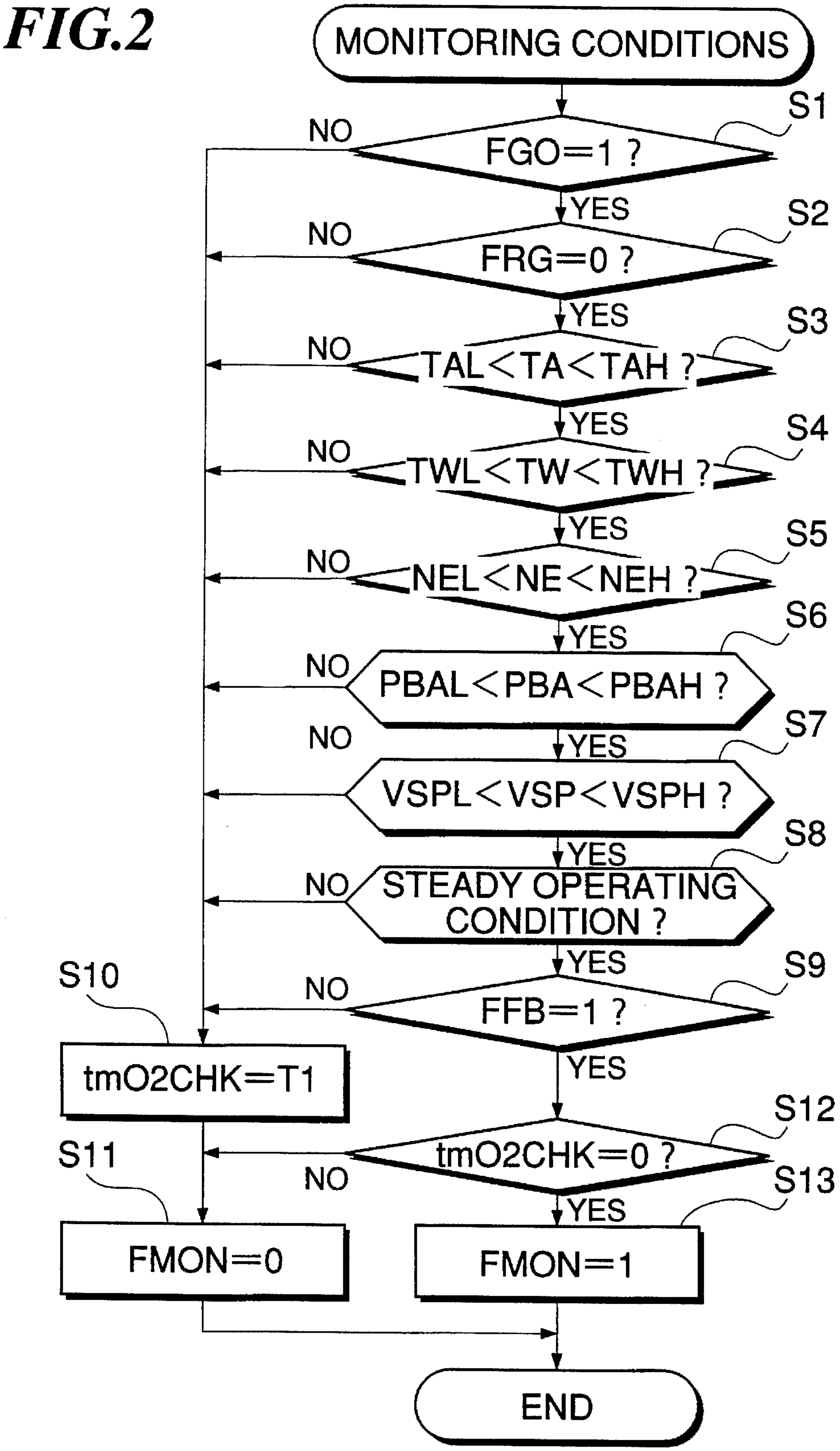
FIG. 2 is a flowchart showing a subroutine for determining satisfaction of conditions for monitoring deterioration of an O2 sensor.

FIG. 2 shows a routine for determining whether or not preconditions for monitoring the deterioration degree of the O2 sensor 19 are satisfied. The routine is executed as a background processing.

First, at a step S1, it is determined whether or not a flag FGO is set to "1" to permit execution of the monitoring. If the answer is affirmative (YES), the monitoring is permitted, and then at a step S2 it is determined whether or not a flag FPG is set to "0". The flag FPG is set to "1" when purging of evaporative fuel from the evaporative emission control system is interrupted. Further, when the flag FPG is set to "1", a fuel supply system of the engine is monitored. Therefore, if the flag FPG is set to "1", the monitoring of the O2 sensor 19 is inhibited.

On the other hand, if the flag FPG is set to "0", the program proceeds to a step S3, wherein it is determined whether or not the intake air temperature TA detected by the TA sensor 11 falls between a predetermined lower limit value TAL (e.g. 0° C.) and a predetermined higher limit value TAH (e.g. 100° C.). If the answer is affirmative (YES), it is determined at a step S4 whether or not the engine coolant temperature TW detected by the TW sensor 12 falls between a predetermined lower limit value TWL (e.g. 60° C.) and a predetermined higher limit value TWH (e.g. 100° C.). If the answer is affirmative (YES), it is determined at a step S5 whether or not the engine rotational speed NE detected by the NE sensor 13 falls between a predetermined lower limit value NEL (e.g. 1900 rpm) and a predetermined higher limit value NEH (e.g. 2400 rpm). If the answer is affirmative (YES), it is determined at a step S6 whether or not the intake pipe absolute pressure PBA detected by the PBA sensor 10 falls between a predetermined lower limit value PBAL (e.g. 220 mmHg) and a predetermined higher limit value PBAH (e.g. 530 mmHg). If the answer is affirmative (YES), it is determined at a step S7 whether or not the vehicle speed VSP detected by the VSP sensor 15 falls between a predetermined lower limit value VSPL (e.g. 80 km/hr) and a predetermined higher limit value VSPH (e.g. 100 km/hr). If the answer is affirmative, the program proceeds to a step S8.

At the step S8, it is determined whether or not the vehicle on which the engine 1 is installed is in a steady traveling condition. The steady traveling condition of the vehicle is determined from whether or not a variation in the vehicle speed has continuously been within a range of ±0.8 km/hr per second over two seconds. If the answer is affirmative, it is determined at a step S9 whether or not a flag FFB is set to "1", i.e. whether or not feedback control based on the output from the O2 sensor 19 is being carried out. If the answer is affirmative (YES), the program proceeds to a step S12.

On the other hand, if any of the answers to the questions at the steps S1 to S9 is negative (NO), the program proceeds to a step S10, wherein a timer tmO2CHK is set to a predetermined time period T1 (e.g. 5 sec), and then a flag FMON is set to "0", at a step S11, to indicate that the monitoring conditions are not satisfied, followed by terminating the program.

On the other hand, if the answer at the step S9 is affirmative (YES), then it is determined at the step S12 whether or not the value of the timer tmO2CHK is equal to "0". If the answer is negative (NO), which means that the predetermined time period T1 has not elapsed, it is determined that the monitoring conditions are not satisfied, and therefore the flag FMON is set to "0" at the step S11, followed by terminating the program.

On the other hand, if the answer at the step S12 is affirmative (YES), which means that the value of the timer tmO2CHK is equal to "0" to indicate that the predetermined time period T1 has elapsed, it is determined that the monitoring conditions are satisfied. Then, the flag FMON is set to "1" at a step S13, followed by terminating the program.

Figure 3:
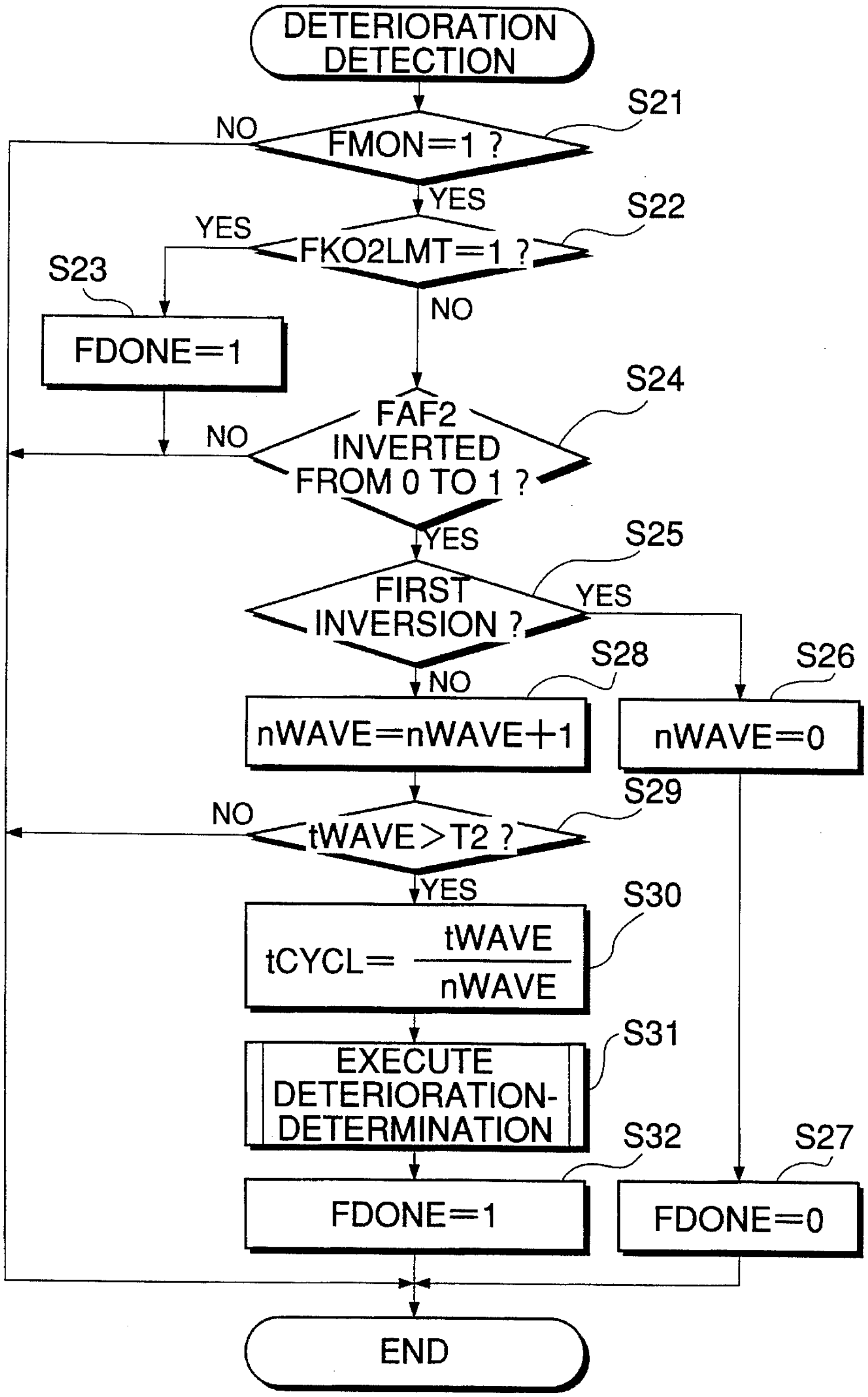
FIG. 3 is a flowchart showing a main routine for detecting deterioration of the O2 sensor.

FIG. 3 shows a routine for detecting the deterioration of the O2 sensor 19. This program is executed, e.g. every 100 msec, in synchronism with signal pulses generated from a timer incorporated in the ECU 5.

At a step S21, it is determined whether or not the flag FMON is set to "1". If the answer is negative (NO), it is determined that the monitoring conditions are not satisfied, and therefore the program is immediately terminated. On the other hand, if the answer is affirmative (YES), it is determined at a step S22 whether or not a flag FKO2LMT is set to "1", which means that the air-fuel ratio correction coefficient KO2 is held at a predetermined upper limit value or a predetermined lower limit value, i.e., the KO2 value has continuously been set at the predetermined upper limit value or the predetermined lower limit value. If the answer is affirmative (YES), i.e. if the KO2 value is held at the predetermined upper or lower limit value, the program proceeds to a step S23, wherein a flag FDONE is set to "1", followed by terminating the program. Specifically, the flag FDONE is set to "0" when a command to start detection of the O2 sensor 19 deterioration is issued by the CPU 5, and set to "1" when the detection of the O2 sensor 19 deterioration has been completed. Therefore, when the air-fuel ratio correction coefficient KO2 is held at the predetermined upper or lower limit value, the flag FDONE is set to "1", which means that the detection of the O2 sensor 19 deterioration has been already executed, and then the program is immediately terminated.

On the other hand, if the flag FKO2LMT is not set to "1", it is determined at a step S24 whether or not a flag FAF2 has been inverted from "0" set in the last loop of execution of the routine to "1" set in the present loop thereof. The flag FAF2 is set to "0" when the air-fuel ratio of a mixture supplied to the engine is lean, and set to "1" when a predetermined time period has elapsed since an inversion of the air-fuel ratio of the mixture occurred from a lean value to a rich value. If the answer to the question of the step S24 is affirmative (YES), i.e. if the air-fuel ratio of the mixture has been inverted from a lean value to a rich value in the present loop, the program proceeds to a step S25, wherein it is determined whether or not the flag FAF2 has been inverted for the first time after the monitoring of detection of the O2 sensor 19 deterioration was permitted. In the first loop of execution of the routine, the answer is affirmative (YES), and then the program proceeds to a step S26, wherein the number nWAVE of times of inversion in the O2 sensor output is set to "0". Then, at a step S27 the flag FDONE is set to "0" to indicate that the detection of the O2 sensor 19 deterioration should be started, followed by terminating the routine.

On the other hand, if the answer at the step S25 becomes negative (NO) in the next or a subsequent loop, the program proceeds to a step S28, wherein the number nWAVE of times of inversion is incremented by "1", and then it is determined at a step S29 whether or not a measuring time period tWAVE for counting the number nWAVE of times of inversion exceeds a predetermined time period T2 (e.g. 10 sec). If the answer is negative (NO), the program is immediately terminated, whereas if the answer is affirmative (YES), the program proceeds to a step S30, wherein an inversion period tCYCL is calculated by the use of the following equation (2):

$$tCYCL=tWAVE/nWAVE \qquad (2)$$

After the inversion period tCYCL has been calculated as above, determination of deterioration of the O2 sensor is carried out at a step S31, and the flag FDONE is set to "1" to indicate that detection of the O2 sensor 19 deterioration has been completed, at a step S32, followed by terminating the routine.

Figure 4:
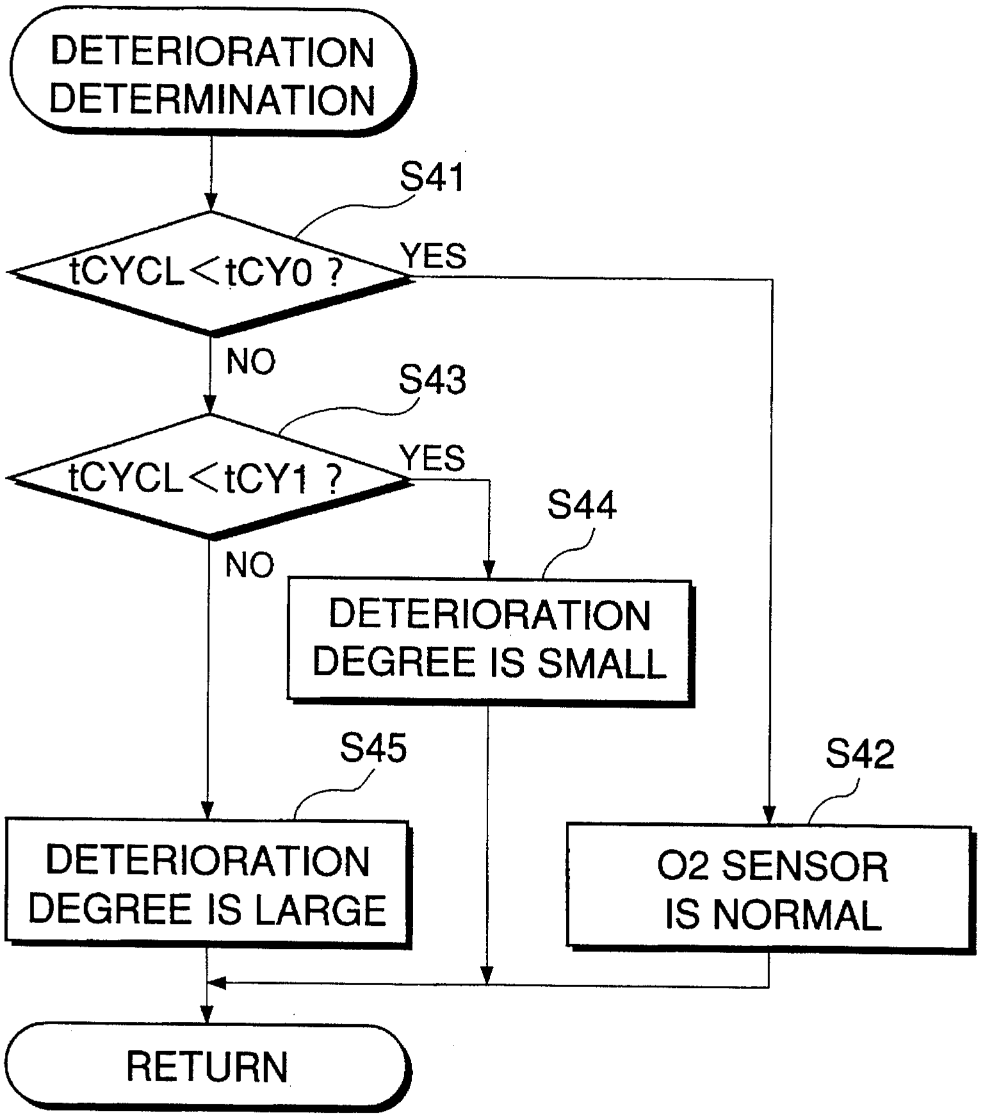
FIG. 4 is a flowchart showing a subroutine for determining deterioration of the O2 sensor.

The determination of the O2 sensor deterioration is carried out by executing a deterioration-determining subroutine shown in FIG. 4.

First, it is determined at a step S41 whether or not the inversion period tCYCL calculated at the step S30 in FIG. 3 is shorter than a first predetermined inversion period tCY0. The first predetermined inversion period tCY0 is set to a value short enough to determine that the O2 sensor 19 is not deteriorated, e.g. 2 sec. If the answer is affirmative (YES), it is determined at a step S42 that the O2 sensor 19 is in a normal state, followed by the program returning to the main routine of FIG. 3. On the other hand, if the answer at the step S41 is negative (NO), it is determined at a step S43 whether or not the inversion period tCYCL is shorter than a second predetermined inversion period tCY1. The second predetermined inversion period tCY1 is set to a value longer than the first predetermined inversion period tCY0. If the answer is affirmative (YES), i.e. if tCYCL<tCY1 holds, it is determined at a step S44 that the O2 sensor 19 is deteriorated but the deterioration degree thereof is so small that feedback control of the engine need not be inhibited, followed by the program returning to the main routine of FIG. 3. On the other hand, if the answer at the step S43 is negative (NO), it is determined at a step S45 that the O2 sensor 19 is deteriorated to such a large degree as to cause degradation of exhaust emission characteristics and drivability of the engine, i.e. the deterioration degree of the O2 sensor 19 is "large", followed by the program returning to the main routine of FIG. 3.

Figure 5:
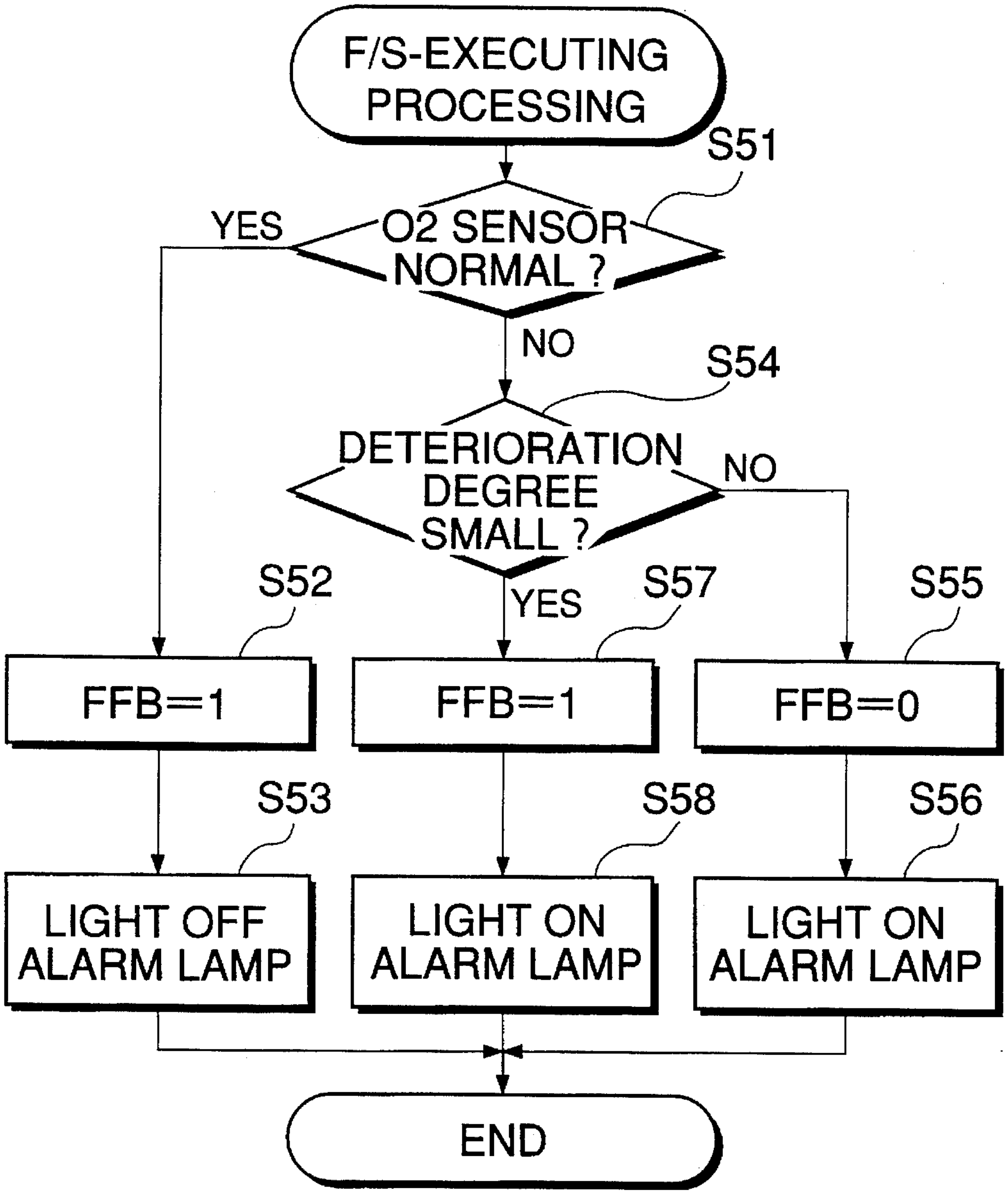
FIG. 5 is a flowchart showing a routine for executing a failsafe processing.

FIG. 5 shows a routine for carrying out a failsafe action, based on results of the detection executed by the deterioration-determining routine of FIG. 4. This routine is executed, e.g. every 100 msec, in synchronism with signal pulses generated from a timer incorporated in the ECU 5.

It is determined at a step S51 whether or not the O2 sensor 19 has been determined to be in a normal state, by the deterioration-determining routine of FIG. 4. If the answer is affirmative (YES), the flag FFB is set to "1" to permit execution of the air-fuel ratio feedback control, at a step S52, and a signal indicative of an OFF command is delivered to the alarm lamp 20 at a step S53, followed by terminating the routine. In the present case, the O2 sensor 19 is in a normal state, and therefore the air-fuel ratio feedback control, described hereinafter, is executed, based on output voltage from the O2 sensor 19.

On the other hand, if the answer at the step S51 is negative (NO), the O2 sensor 19 is at least in a deteriorated state, and therefore it is determined at a step S54 whether or not the deterioration degree of the O2 sensor 19 is "small" or not. If the answer at the step S54 is negative (NO), the deterioration degree of the O2 sensor 19 is "large", and then the flag FFB is set to "0" to inhibit execution of the air-fuel ratio feedback control, at a step S55. Then, an ON command signal is delivered to the alarm lamp 20, at a step S56, followed by terminating the present routine.

On the other hand, if the answer at the step S54 is affirmative (YES), the O2 sensor 19 is in such a slightly deteriorated state that the air-fuel ratio feedback control need not be inhibited. Therefore, the flag FFB is set to "1" to permit execution of the air-fuel ratio feedback control, at a step S57, to avoid degraded exhaust emission characteristics and drivability of the engine. Then, the ON command signal is delivered to the alarm lamp 20 to inform the driver of the deterioration of the O2 sensor 19, at a step S58, followed by terminating the present routine.

In the above described manner, according to the air-fuel ratio control system of the present invention, when the O2 sensor 19 is deteriorated, the alarm lamp 20 is lighted on to immediately inform the driver of the deterioration of the O2 sensor 19, however, execution of the air-fuel ratio feedback control per se is controlled in appropriate manners depending on the deterioration degree of the O2 sensor 19. As a result, the O2 sensor 19 can be utilized to capacity to thereby maintain good exhaust emission characteristics as well as good drivability of the engine, as compare with the conventional case where the air-fuel ratio control is inhibited regardless of the deterioration degree of the sensor.

Table 1 shows the relationship between the operation of the alarm lamp 20 and the execution of the air-fuel ratio control, based on the deterioration degree of the O2 sensor 19, and the drivability and exhaust gas purification efficiency (exhaust emission characteristics) of the engine.

TABLE 1

| DETERIORATION DEGREE OF O2 SENSOR 19 | ALARM LAMP 20 | AIR-FUEL RATIO CONTROL | DRIVABILITY | EXHAUST GAS PURIFICATION EFFICIENCY |
|---|---|---|---|---|
| NORMAL (tCYCL < tCY0) | OFF | PERMITTED | O | O |
| "SMALL" (SLIGHTLY DETERIORATED) (tCY0 ≦ tCYCL < tCY1) | ON | PERMITTED | Δ | Δ |
| "LARGE" (SERIOUSLY DETERIORATED) (tCYCL ≧ tCY1) | ON | INHIBITED | X | X |

As is clear from the table, according to the air-fuel ratio control system of the invention, when the O2 sensor 19 is in a normal state, the alarm lamp is lighted off and the air-fuel ratio control is executed, and therefore desired drivability and exhaust emission characteristics of the engine is attained. Further, even when the O2 sensor 19 is deteriorated, if the deterioration degree of the O2 sensor 19 is "small", execution of the air-fuel ratio control is continued, with the alarm lamp 20 being lighted on. Although the execution of the air-fuel ratio control using such a slightly deteriorated O2 sensor cannot avoid a degradation in the drivability and exhaust emission characteristics as compared with one using a normal O2 sensor, inhibition of the air-fuel ratio control will cause further degradation in the drivability and exhaust emission characteristics. Therefore, in the present embodiment, the driver is promptly informed of the deterioration of the O2 sensor 19 so that early checking of the O2 sensor 19 may be carried out, while execution of the air-fuel ratio control is continued, to thereby avoid extreme degradation in the drivability and exhaust emission characteristics of the engine. On the other hand, if the deterioration degree of the O2 sensor 19 is "large", there is a fear that a disconnection or a short circuit exists in the electrical system of the O2 sensor 19. Therefore, in such a case, not only the alarm lamp 20 is lighted on, but also execution of the air-fuel ratio feedback control is inhibited, to thereby avoid extreme degradation in the drivability and exhaust emission characteristics of the engine.

Further, when the deterioration degree of the O2 sensor 19 is "large", the alarm lamp 20 may be blinked in such a manner as to display the deterioration degree, instead of being continuously lighted on.

The air-fuel ratio feedback control is carried out according to a well known KO2-calculating routine for calculating the air-fuel ratio correction coefficient KO2.

Figure 6:
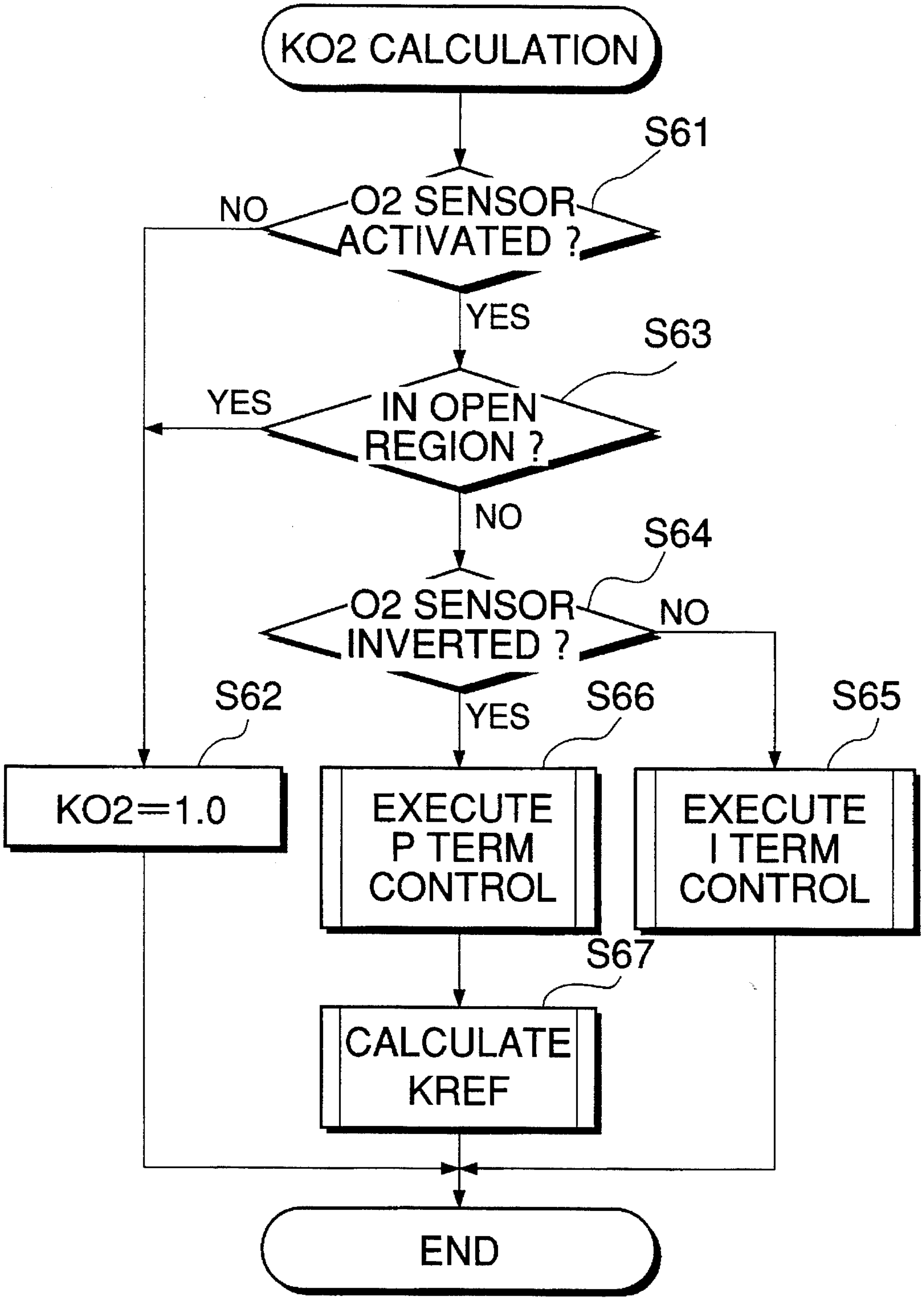
FIG. 6 is a flowchart showing a routine for calculating a feedback correction coefficient KO2.

FIG. 6 shows the KO2-calculating routine. This routine is executed in synchronism with generation of each TDC signal pulse.

First, it is determined at a step S61 whether or not the activation of the O2 sensor 19 has been completed, i.e. whether or not the output voltage value from the O2 sensor 19 has reached an activation starting voltage value Vx (e.g. 0.6 V). If the answer is negative (NO), the feedback correction coefficient KO2 is set to a value of 1.0, at a step S62, followed by terminating the routine.

On the other hand, if the answer at the step S61 is affirmative (YES), the program proceeds to a step S63, wherein it is determined whether or not the engine 1 is operating in an open loop control region (open region). If the answer is affirmative (YES), the program proceeds to the step S62, followed by terminating the routine. On the other hand, if the answer at the step S63 is negative (NO), it is determined that the engine is operating in the air-fuel ratio feedback control region, and therefore the feedback control is carried out. More specifically, it is determined at a step S64 whether or not the output level from the O2 sensor 19 has been inverted, and if the answer is affirmative (YES), i.e. if the output level from the O2 sensor 19 has been inverted, proportional control (P term control) is carried out at a step S66. In the P term control, it is determined whether or not the output voltage value from the O2 sensor 19 is lower than a predetermined reference value Vref, i.e. whether or not the output voltage of the O2 sensor 19 is at a LOW level. If the output voltage level is LOW, an enriching correction value PR is added to the present value of the feedback correction coefficient KO2, to obtain an updated value of the coefficient KO2. On the other hand, if the output voltage value from the O2 sensor 19 is higher than the predetermined value Vref, i.e. whether or not the output voltage level is HIGH, a leaning correction value P is subtracted from the present value of the feedback correction coefficient KO2, to obtain an updated value of the coefficient KO2. Thus, when the output signal from the O2 sensor 19 is inverted, the enriching correction value PR is added to the KO2 value or the leaning correction value P is subtracted from the KO2 value, to correct the air-fuel ratio according to the inversion. Further, the thus calculated KO2 value is employed to calculate an average value KREF thereof, at a step S67, followed by terminating the routine.

On the other hand, if the answer at the step S64 is negative (NO), i.e. if the output level from the O2 sensor is not inverted, integral control (I term control) is carried out at a step S65, followed by terminating the routine. In the I term control, if the output voltage level from the the O2 sensor 19 is LOW, the number of TDC signal pulses is counted and the feedback correction coefficient KO2 is held at an immediately preceding value thereof until the count value of TDC signal pulses reaches a predetermined value N. When the count value has reached the predetermined value N, a correction value I is added to the feedback correction coefficient KO2, to thereby calculate an updated value of the coefficient KO2. Similarly, if the output voltage level from the O2 sensor 19 is HIGH, the number of TDC signal pulses is counted and the feedback correction coefficient KO2 is held at an immediately preceding value thereof until the count value of the TDC signal pulses reaches the predetermined value N. When the count value has reached the predetermined value N, the correction value I is subtracted from the KO2 value, to thereby calculate an updated value of the KO2 value. In this manner, when the output from the O2 sensor 19 is held at the lean or rich level, whenever TDC signal pulses are generated the predetermined number N of times, the correction value I is added to or subtracted from the feedback correction coefficient KO2 so that the lean or rich level of the output value from the O2 sensor is corrected, to thereby calculate an updated value of the feedback correction coefficient KO2.

The fuel injection period Tout is calculated based on the above calculated feedback correction coefficient KO2 by the use of the aforesaid equation (1). Then, an amount of fuel corresponding to the calculated fuel injection period Tout is supplied to the engine 1, thus carrying out the air-fuel ratio feedback control in response to the air-fuel ratio of exhaust gases.

What is claimed is:

1. An air-fuel ratio control system for an internal combustion engine having an exhaust system, comprising:

exhaust gas component concentration-detecting means arranged in said exhaust system of said engine, for detecting concentration of a specific component present in exhaust gases emitted from said engine;

air-fuel ratio control means for controlling an air-fuel ratio of an air-fuel mixture to be supplied to said engine, in response to a difference between an output value from said exhaust gas component concentration-detecting means and a predetermined reference value;

deterioration-detecting means for detecting deterioration of said exhaust gas component concentration-detecting means, based on said output value from said exhaust gas component concentration-detecting means;

display signal-output means for outputting a deterioration display signal when deterioration of said exhaust gas component concentration-detecting means is detected by said deterioration-detecting means; and control means for determining whether execution of said air-fuel ratio control means is to be inhibited or to be continued, based on a deterioration degree of said exhaust gas component concentration-detecting means when deterioration of said exhaust gas component concentration-detecting means is detected by said deterioration-detecting means.

2. An air-fuel ratio control system as claimed in claim 1, wherein said control means inhibits said execution of said air-fuel ratio control when said deterioration degree of said exhaust gas concentration-detecting means is larger than a predetermined value, and continues said execution of said air-fuel ratio control when said deterioration degree of said exhaust gas concentration-detecting means is smaller than said predetermined value.

3. An air-fuel ratio control system as claimed in claim 2, wherein said exhaust gas component concentration-detecting means has said output value therefrom inverted when an air-fuel ratio of said exhaust gases changes across a stoichiometric air-fuel ratio, said control means inhibiting said execution of said air-fuel ratio control when an inversion period of said output value is larger than a predetermined value, and continuing said execution of said air-fuel ratio control when said inversion period of said output value is smaller than said predetermined value.

4. An air-fuel ratio control system as claimed in claim 1, wherein when deterioration of said exhaust gas component concentration-detecting means is detected, said display signal-output means outputs said deterioration display signal irrespective of a degree of said detected deterioration.

5. An air-fuel ratio control system as claimed in claim 1, wherein when deterioration of said exhaust gas component concentration-detecting means is detected, said display signal-output means outputs said deterioration display signal in a manner dependent upon said degree of said detected deterioration.

* * * * *